W. STUEBING.

MACHINE FOR CUTTING AND MOUNTING SHEET METAL STRIPS.

APPLICATION FILED APR. 4, 1910.

Reissued Apr. 15, 1913.

13,553.

6 SHEETS—SHEET 1.

Witnesses

Henry T. Baer.

Saml. Lord

Inventor

Wm. Stuebing by John W. Greeley

Attorney

W. STUEBING.

MACHINE FOR CUTTING AND MOUNTING SHEET METAL STRIPS.

APPLICATION FILED APR. 4, 1910.

Reissued Apr. 15, 1913. 13,553.

6 SHEETS—SHEET 2.

Witnesses

Henry T. Baer.

Saml. G. Cox

Inventor

Wm Stuebing

By John W. Strohli

Attorney

W. STUEBING.

MACHINE FOR CUTTING AND MOUNTING SHEET METAL STRIPS.

APPLICATION FILED APR. 4, 1910.

Reissued Apr. 15, 1913. 13,553.

6 SHEETS—SHEET 3.

Witnesses
Henry T. Barr.
Saml. G. Barr

Inventor
Wm Stuebing
by John W. Strehli
Attorney

W. STUEBING.

MACHINE FOR CUTTING AND MOUNTING SHEET METAL STRIPS.

APPLICATION FILED APR. 4, 1910.

Reissued Apr. 15, 1913. 13,553.

6 SHEETS—SHEET 4.

*Witnesses*
Henry T. Baer.
Saml G. Bond

*Inventor*
Wm Stuebing
by John W. Stoddi
*Attorney*

W. STUEBING.
MACHINE FOR CUTTING AND MOUNTING SHEET METAL STRIPS.
APPLICATION FILED APR. 4, 1910.
Reissued Apr. 15, 1913.
13,553.
6 SHEETS—SHEET 5.
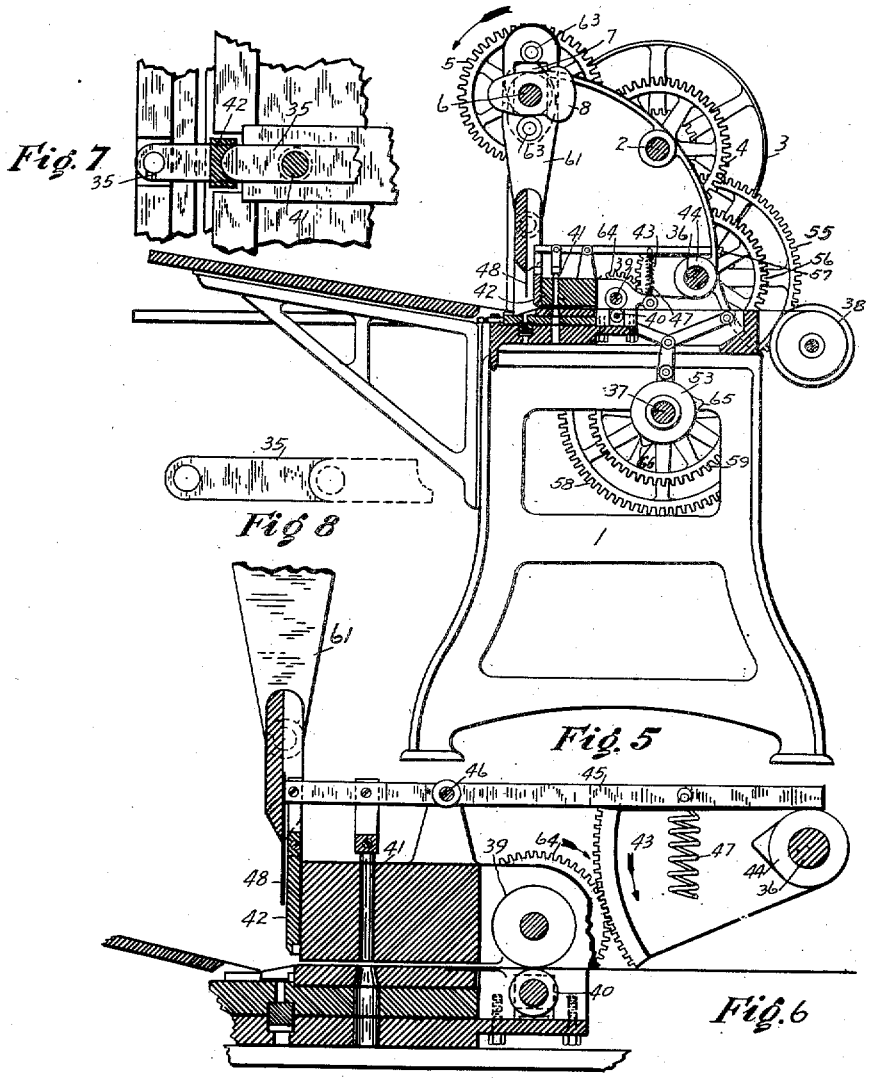
Witnesses
Henry T. Baer.
Lauri G. Cox
Inventor
Wm Stuebing
By John W. Strehli
Attorney W. STUEBING.
MACHINE FOR CUTTING AND MOUNTING SHEET METAL STRIPS.
APPLICATION FILED APR. 4, 1910.
Reissued Apr. 15, 1913.
13,553.
6 SHEETS—SHEET 6.
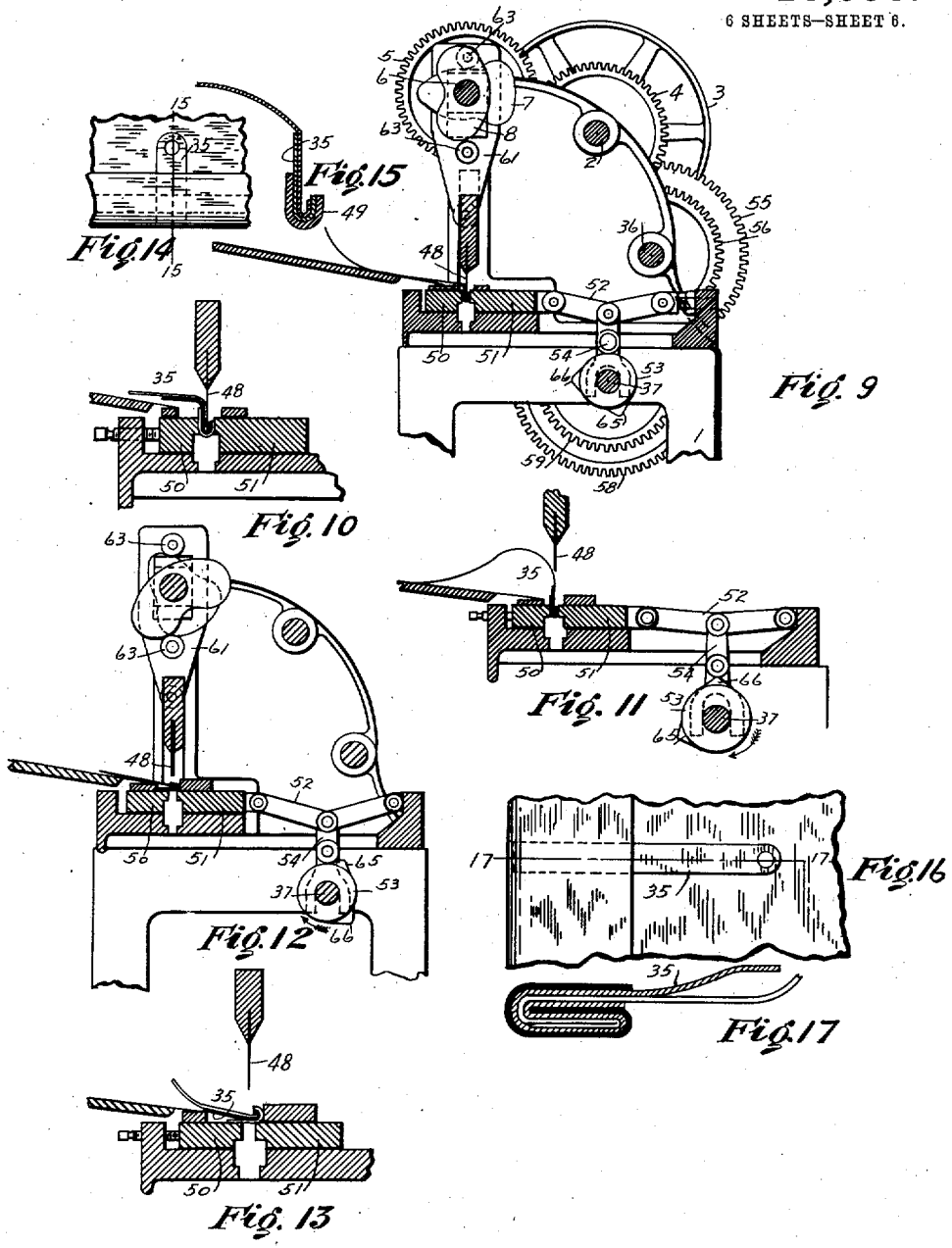
Witnesses
Henry T. Baer.
Saml. G. Cox
Inventor
Wm. Stuebing
by John W. Strehli
Attorney

UNITED STATES PATENT OFFICE.

WILLIAM STUEBING, OF CINCINNATI, OHIO.

MACHINE FOR CUTTING AND MOUNTING SHEET-METAL STRIPS.

13,553. Specification of Reissued Letters Patent. Reissued Apr. 15, 1913.

Original No. 883,838, dated April 7, 1908, Serial No. 332,789. Application for reissue filed April 4, 1910. Serial No. 553,451.

*To all whom it may concern:*

Be it known that I, WILLIAM STUEBING, a citizen of the United States of America, and resident of the city of Cincinnati, in the county of Hamilton and State of Ohio, have invented a certain new and useful Machine for Cutting and Mounting Sheet-Metal Strips; and I do hereby declare the following to be a full and exact description thereof, reference being had to the accompanying drawings, making part of this specification.

My invention relates to machines for severing sheet metal strips, and the mounting of same as a binding for the edges of calendars, show cards, advertising cards, and the like, and it has for its object to simplify the mechanism and reduce the number of operative parts to a minimum, whereby a very efficient and simple machine is the result, in which the sheet metal is cut into strips of the proper width and then automatically fed to the folders, at the same time that eyelets for the bound paper sheet are also automatically formed and fed into position to be bound up with the metal strips in proper position, all of which is accomplished by the novel constructions and arrangement of parts to be hereinafter particularly pointed out and claimed.

Figures 1, 18:
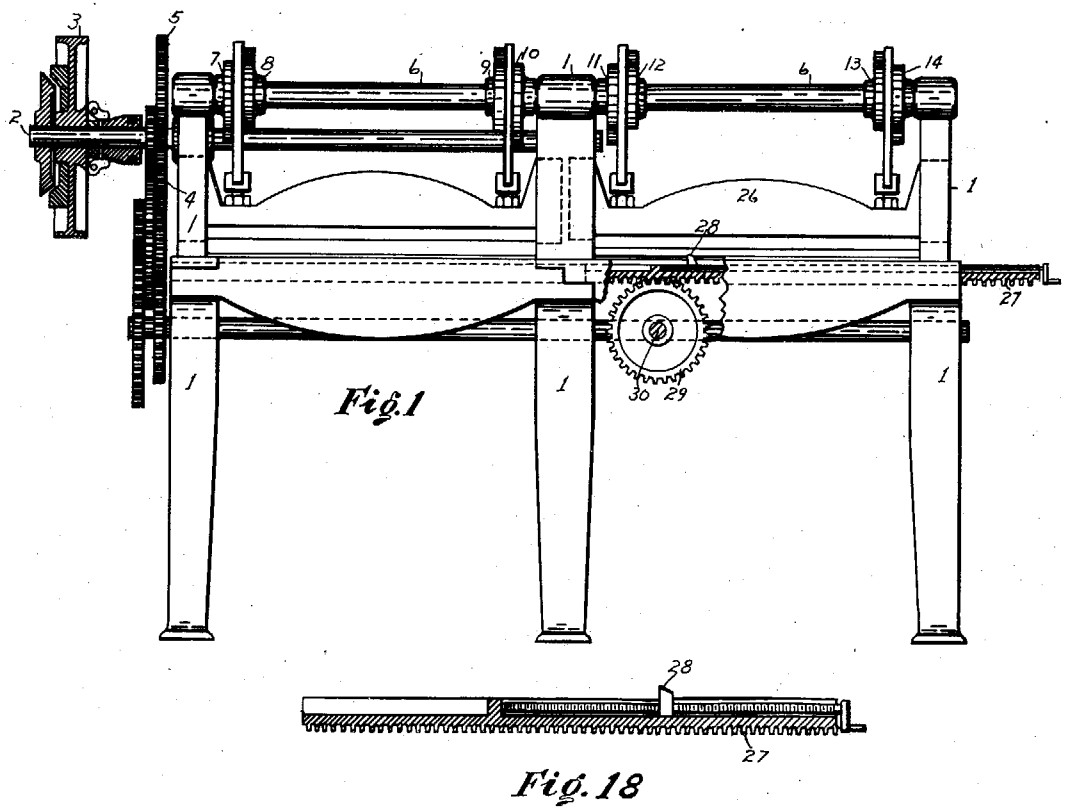
Figure 2:
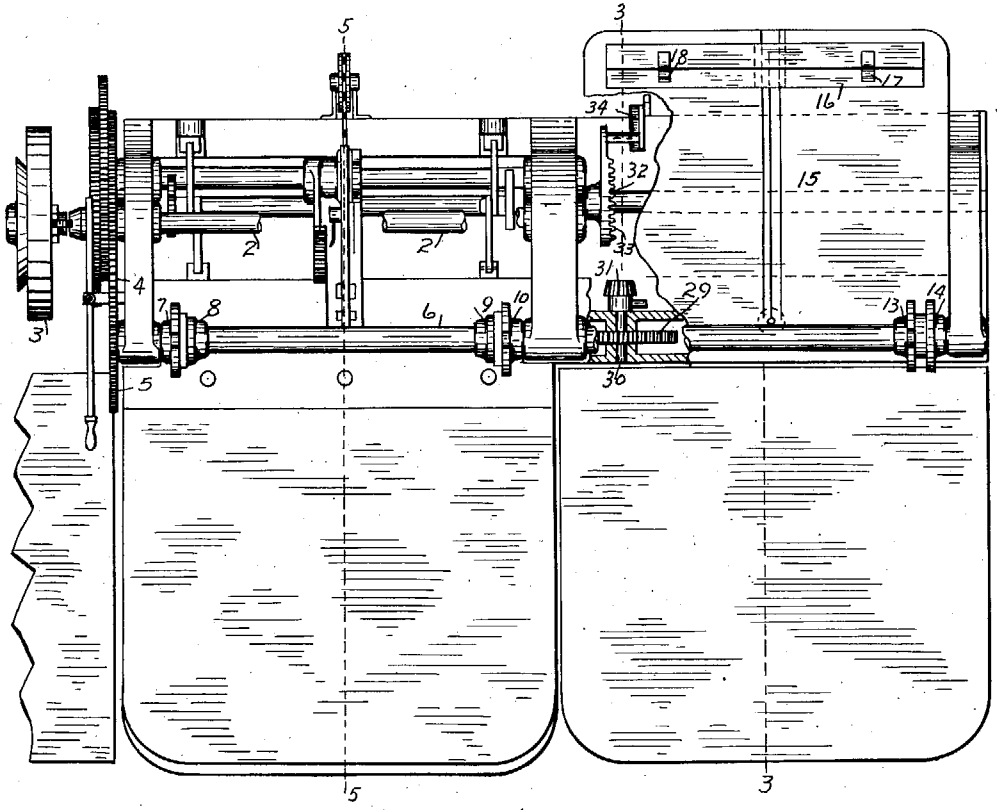
Figure 3:
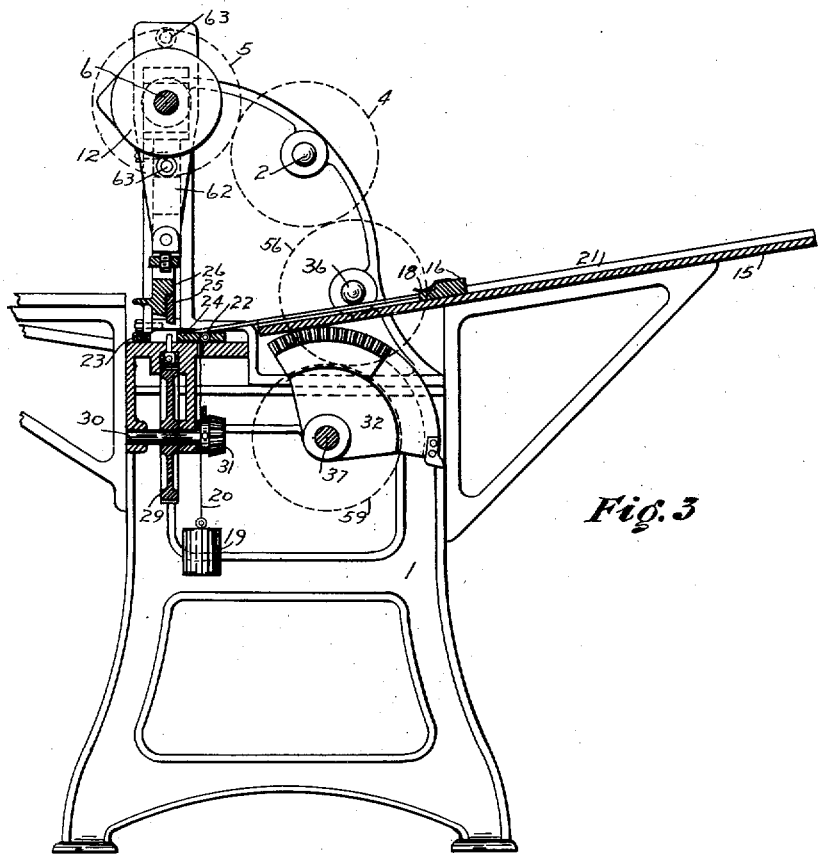
Figure 4:
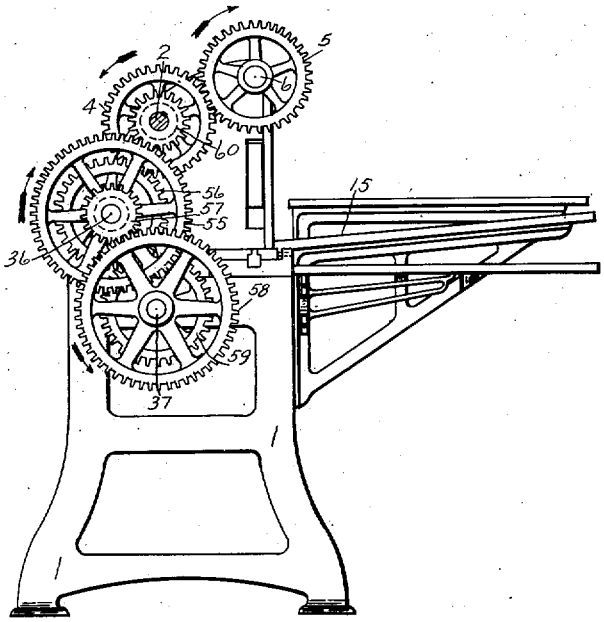

In the drawings, Figure 1, is a front elevation of my tin cutting and mounting machine, the driving pulley shown in section, and the rack partially in section. Fig. 2 is a plan view with feed board cut away, and a portion of frame in section. Fig. 3 is a section on line 3—3 of Fig. 2. Fig. 4 is an end view showing driving gears. Fig. 5 is a section on line 5—5 of Fig. 2 showing the position of the different parts of the machine just before the first step in crimping. Fig. 6 is an enlarged view of the punch and crimper shown in Fig. 5. Fig. 7 is a plan view of punch and shears for making eyelet. Fig. 8 is a plan view of eyelet. Fig. 9 is a sectional view showing the position of the different parts in the second step of crimping. Fig. 10 is an enlarged view of Fig. 9, showing crimping bar and vise with work in position. Fig. 11 is a sectional view showing how the crimped piece is pressed by the vise. Fig. 12 is a sectional view, showing the position of parts ready for the last crimp. Fig. 13 is an enlarged view of Fig. 12, showing crimping bar, vise, and work in position. Fig. 14 is an elevation showing eyelet in paper after the first step. Fig. 15 is a section on line 15—15 of Fig. 14. Fig. 16 shows eyelet in paper after the last operation. Fig. 17 is a section on line 17—17 of Fig. 16. Fig. 18 is a sectional side elevation of rack for feeding the metal strips.

The framework 1 of the machine has a main shaft 2, which is connected to any suitable source of power, as, for instance, by a clutch pulley 3, fixed thereon, and driven by a belt. The main shaft 2 carries a gear wheel 4, which meshes with the gear wheel 5 on the upper cam shaft 6, which carries a number of cams 7, 8, 9, 10, 11, 12, 13 and 14 fixed thereon, and connected—as hereinafter described—to the several crimping and cutting parts, supported by the framework 1, and hereinafter described. The several cams on shaft 6 are enabled to act on the knife bar, and crimping bar, through the slotted connecting links 61 and 62. On the links are rollers 63, against which the cams operate to raise and lower the knife bar and crimping bar.

The tin or sheet metal to be folded over the edge of the display card, or other article, is fed to the machine in sheets, preferably by the feeding mechanism hereinafter described. The sheet of metal is laid upon a stationary table 15, and clamped to the sliding feed bar 16 by the clamps 17—18, and fed forward by the weight 19, which is attached to the feed bar 16 by a cord 20, the cord 20 passing through the groove 21, and over the pulley 22. The sheet of metal is fed forward until it strikes against the limiting stop 23. In order to coöperate with the knife bar 24 on the frame work 1, a second knife bar 25 is fixed to a cross-bar 26, arranged to reciprocate vertically. The two knife bars thus constitute shears for cutting the sheet metal into strips of the desired width.

When the upper knife bar 25 descends, the projecting portion of the metal sheet is severed and falls on to the reciprocating rack 27 ahead of the adjustable stop 28, this stop being adjustable to allow for the different lengths of metal strips.

Meshing with the rack 27, is the gear 29. On the same shaft 30 on which the gear 29 is secured is the bevel gear 31, which engages with the segment gear 32. The segment gear 32 is composed of two segments 33 and 34, arranged so that the segment 33 works on the opposite side of the bevel gear 32, from which 34 works thereby reversing the direction of the revolution of the bevel gear 31 and the shaft 30, to which the bevel gear 31 is rigidly attached. The gear 29 being secured to the shaft 30 revolves as the shaft 30 revolves. The segments 33 and 34 of the segment gear 32 only engage the bevel gear 31 for a portion of a revolution, thereby permitting the rack 27 to remain at rest while the strip of tin is being sheared off. The object of the segment gear 32 meshing with the bevel gear 31 through the segments 33 and 34 on opposite sides of the bevel gear 32 is to cause the rack 27, on which the strip of sheared tin has been deposited, to carry the strip of tin to the crimping mechanism through the agency of the gear 29, and leave it there to be crimped onto the display card, or other article, and the segment gears are arranged on opposite sides, so that a positive throw of the transfer rack may be had in each direction, to obviate the necessity of relying on springs for either of these movements.

The manner in which the tin is crimped on to the display card, or other article, will be fully described hereinafter.

The cams 11, 12, 13 and 14 which are attached to the shaft 6 cause the knife bar 25 to have a vertically reciprocating motion. The same time that the sheared strip of tin is crimped on to the display card, or other article, an eyelet 35 is crimped on with it. The eyelet 35 is formed in the following manner.

The spool 38 has wound up on it a ribbon of brass, which passes through the rolls 39 and 40. The revolving of the rolls 39 and 40 causes the ribbon of brass to unwind from the spool 38 and pass under the punch and shear 41 and 42. The roll 39 is revolved by the segment gear 43, on the shaft 36, which meshes with the gear 64, and is so timed as to advance the ribbon of brass to the proper place for punching and shearing, where it remains stationary long enough to be punched, sheared and crimped on to the display card, or other article, with the strip of sheared tin. The punch and shears 41 and 42 are caused to perform their several functions through the agency of the cam 44 and lever 45. The lever 45 is pivoted at 46 and held against the cam by spring 47. The spring 47 holds the punch 41 and shear 42 up until the high point of the cam 44 passes under the lever 45, when the punch and shear perform their work.

The operation of the different parts of the crimping mechanism is as follows: The crimping blade 48 has a vertical reciprocating motion, which is brought about through the action of the cams 7, 8, 9 and 10 on the shaft 6. The revolutions of the shaft 6 are so timed that when the strip of tin 49 and eyelet 35 have been placed by the different mechanical movements in the right relation to each other, the display card, or other article, is placed on top of the strip of tin 49, the crimp bar 48 descends, pressing the display card, strip of tin and eyelet, down between the jaws 50, 51 of the vise, as shown in Figs. 9 and 10. The jaws 50, 51 of the vise are forced together by the toggle joint 52. The toggle joint 52 is actuated by the cam 53 on the shaft 37. The cam 53 has two high points, so that through each cycle the machine passes, the toggle joint will close the jaws 50 and 51 twice, once after each descent of the crimping blade 48. The cam 53 is connected to the toggle joint 52 by the link 54.

Figs. 12 and 13 show the position of the crimping blade and the work just before it is crimped for the last time, and after the parts have been pressed together by the vise, the finished work will be produced as shown in views Fig. 16 and Fig. 17; it being understood that after the first fold of the strip it is necessary for the operator to place the card and partially folded strip in proper position.

The gearing for operating my cutting and crimping machine is shown in Fig. 4. The gear 60 is keyed to the shaft 2, and meshes with the gear 55, which runs loose on the shaft 36. The gear 55 has the gear 57 attached to it, and the gear 57 engages with the gear 58, which is keyed to the shaft 37. The gear 59 is keyed to the shaft 37, and meshes with the gear 56, which is keyed to the shaft 36, and the gear 56 engages the gear 4, which is loose on the shaft 2, and the gear 4 in turn meshes with the gear 5, which is keyed to the shaft 6. This arrangement gives the right speed to every shaft, so that each part will be in the right relation to every other part to give the desired result, each mechanical movement being in proper time to every other.

The operation of my machine is as follows: A sheet of tin is placed on the table 15, and clamped to the sliding feed bar 16 by the clamps 17 and 18, and fed forward by the weight 19, which is attached to the feed bar 16 by a cord 20. The sheet of metal is fed forward until it strikes the limiting stop 23. The sheet of tin is now between the two knife bars 24 and 25; the knife bar 25 descends cutting off a strip of tin the desired width. This strip is carried by the reciprocating rack 27 over beneath the crimping bar 48. During the time the foregoing operations are transpiring, the eyelet 35 has been placed beneath the crimping bar in the right position to be crimped on to the display card, or other article, the same time the strip of tin is. A display card is placed on top of the strip of tin, the crimp bar 48 descends and crimps the several parts for the first time; the crimp bar ascends, when the vise closes and presses all the parts together. The jaws of the vise open, the work is taken out, and the operation of crimping and pressing together of the parts repeated, this last operation making the finished article.

As before stated one of the objects of my invention "is to simplify the mechanism and reduce the number of operative parts to a minimum," and in carrying out this object, I may cut the strips in any other way and feed them to the folding and crimping mechanism in any other manner, as it is common to cut sheets into strips and to do the work quickly and conveniently I cut them in the machine, but I may cut them otherwise, the main features being the folding of the strip and calendar edge and then locking them together.

Having thus described my invention, what I claim as new, and desire to secure by Letters Patent, is:—

1. In a machine of the class described, a cutter for severing sheet metal plates into narrow strips, a crimping bar for folding the strips lengthwise, and means for feeding the severed strips to the crimping bar at each alternate operation thereof, whereby the strips may be double folded with each complete operation of the machine.

2. In a machine of the class described, a cutter for severing sheet metal plates into narrow strips, a crimping bar for folding the strips lengthwise, with a clamp for pressing the strips together, and means for feeding the severed strips to the crimping bar at each alternate operation thereof, whereby the strips may be doublefolded and clamped with each complete operation of the machine.

3. In a machine of the class described, a crimping bar for folding narrow strips of sheet metal lengthwise, and means for feeding the narrow strips to the crimping bar at each alternate operation thereof, whereby the strips may be double folded with each complete operation of the machine.

4. In a machine of the class described, a crimping bar for folding narrow strips of sheet metal lengthwise, and a clamp coöperating therewith to press together the folded strip, and means for feeding the strips of metal to the crimping bar and clamp at each alternate operation thereof, whereby the strips may be double folded with each complete operation of the machine.

5. In a machine of the class described, a fixed and a movable plate forming a clamping member, and a crimping bar for folding lengthwise narrow strips of sheet metal acting at right angles to said clamping member, with mechanism for actuating said crimping bar and movable clamp member in such relation to each other that the strip will be folded between the clamp, and then clamped thereby, with means for feeding the narrow strips to the crimping bar and clamp at each alternate operation thereof, whereby the strips may be double folded and double clamped with each complete operation of the machine.

6. In a machine of the class described, a crimping bar for folding narrow strips of sheet metal lengthwise, and means for feeding the narrow strips to the crimping bar at each alternate operation thereof, with an eyelet punch and shear for forming eyelet strips, and mechanism for feeding the eyelets to the crimping bar simultaneously with the feed of the narrow strips of sheet metal thereto.

7. In a machine of the class described, a cutter for severing the sheet metal plates into narrow strips, a crimping bar folding the strips lengthwise, an eyelet punch and shear for forming eyelet strips, and means for feeding the eyelet strips to the crimping bar, with mechanism for feeding the severed strips thereto simultaneously, and at each alternate operation of the crimping bar.

8. In a machine of the class described, mechanism for feeding the narrow strips of sheet metal to the folding devices, comprising a rack bar provided with a finger, by which the strips are fed, with gear and pinion for actuating the rack bar, and a power driven shaft carrying a pair of segment gears to engage said pinion on opposite sides to give positive throw to the rack bar in both directions, without the intervention of a spring.

9. In a machine of the class described, a power driven shaft, with a crimping bar, and a cutting bar suspended therefrom in line with each other, double acting cams on the power shaft to actuate the crimping bar, and single acting cams to actuate the cutting bar, whereby the cutting bar will be operated with every second operation of the crimping bar.

10. In a machine of the class described, a power driven shaft, with a crimping bar and a cutting bar suspended therefrom in line with each other, double acting cams on the power shaft to actuate the crimping bar, and single acting cams to actuate the cutting bar, whereby the cutting bar will be operated with every second operation of the crimping bar, and a rack bar provided with a finger for feeding narrow strips severed by the cutter to the crimping bar in timed relation with the operation of the cutter, whereby a strip of metal may be fed to the crimping bar with every second operation thereof.

11. In a machine of the class described, a vertically reciprocating crimping blade for folding metal strips and calendar edges together, operating into a slot between jaws, and a horizontally operating clamp, co-acting at definite periods to fold and tightly lock together a strip and a calendar edge.

12. In a machine of the class described, a vertically reciprocating crimping blade for folding metal strips, eyelets and calendar edges together through a slot between clamp jaws, and horizontally operating clamp co-acting at definite periods to re-fold and tightly lock together a strip, eyelet and calendar edges.

13. In a machine of the character described, means for folding a calendar edge, metal strip and eyelet together through a slot between clamping jaws, and means for tightly locking the same together.

14. In a machine of the character described, means for folding metal strips and calendar edges together through a slot, said means consisting of a crimping blade and a stationary and movable jaw, and means for operating the same.

WM. STUEBING.

Witnesses:
EDWARD STUEBING,
H. E. CARSTENS.